Patented Dec. 4, 1934

1,982,873

UNITED STATES PATENT OFFICE 1,982,873

TREATMENT OF BERYLLIUM-BEARING ORES

Charles James, Durham, N. H.; Marion E. James, executrix of said Charles James, deceased, assignor to Skinner & Sherman, Inc., Boston, Mass., a corporation of Massachusetts No Drawing. Application October 27, 1928, Serial No. 315,595

6 Claims. (Cl. 23—16)

This invention relates to the treatment of beryllium-bearing ores, and more particularly to the recovery of beryllium from such ores, especially from beryl, and also to the recovery of cæsium, rubidium and lithium from ores bearing them, and particularly from ores which also bear beryllium.

The beryllium, cæsium, rubidium and lithium are recovered as compounds of these metals although for convenience, such recovery is spoken of as the recovery of beryllium, cæsium, rubidium and lithium.

The beryllium is preferably obtained as a basic carbonate or as hydroxide, both of which may be converted into a pure beryllium oxide by heat. The cæsium and rubidium are preferably recovered as alums, and the lithium as a carbonate.

The most common ore of beryllium is a beryl which contains the beryllium principally as a complex silicate of beryllium and aluminum along with various metallic compounds, such as those of iron, and frequently those of an alkali metal or metals, such as cæsium, rubidium and lithium, as well as potassium and sodium.

The present invention will therefore be described with particular reference to its preferred embodiment in the treatment of beryl, although it may be applied to the treatment of other beryllium-bearing ores, such as chrysoberyl, trimerite, phenacite, leucophanite, meliphanite, bertrandite, eudidymite, epididymite, euclase and hambergite, and also may be applied to beryllium-containing phosphates which may be decomposed with hydrochloric acid instead of the sulphuric acid which is preferably used in decomposing beryl.

The preferred process as applied to beryl may be briefly outlined as follows:

1. Fusion of the ores with an alkaline material, preferably lime, to form a slag.
2. Decomposition of the slag with an acid, preferably sulphuric acid, heating to render the silica insoluble, and water extraction of the thus decomposed slag.
3. Recovery of rubidium and cæsium as alums.
4. Removal of aluminum as ammonium alum.
5. Removal of iron and remaining traces of aluminum as hydroxides and remaining iron as a sulphide.
6. Recovery of beryllium as a basic carbonate.
7. Recovery of ammonium sulphate by crystallization.
8. Recovery of lithium as a carbonate.

The preferred procedure will now be described in detail.

(1) Fusion of the ore

The beryllium ore is preferably first finely ground and mixed with finely ground lime, preferably in the form of calcium hydroxide. Usually about six parts of quick lime are mixed with ten parts of beryl. This ratio may, of course, be varied. The proportions of lime and beryl will govern the fluidity of the slag.

In order to avoid using a dry dusty mixture in the furnace, the lime is preferably first slaked with water and then mixed with the ground beryl to the consistency of mortar. This mixture is spread out and allowed to dry. The product is quite firm and can withstand the burden of the blast furnace used for melting it down.

Instead of pulverizing the beryllium ore and the lime, as above described, lump calcium oxide or calcium carbonate and lump ore may be used, particularly in a larger furnace.

The mixture of beryl and lime is melted down to a slag in a furnace. The beryl can be decomposed by heating the mixture just below fusion. Complete fusion, however, gives a better decomposition and is more easily carried out commercially.

The fusion is preferably carried out in a blast furnace, although other furnaces, such as an electric furnace, may be employed. An initial starter charge of coke or other fuel is first put into the blast furnace and ignited and blown until the coke and the lower part of the furnace have reached a white heat. Then the charge, consisting of the beryl-lime mixture, together with one-half to two-thirds of its volume of coke, is added and supplied from time to time to keep the blast furnace filled. The heat of the coke melts the beryl-lime mixture and the slag may be tapped off from the bottom of the furnace in a fluid state. The ratio of coke to the beryl-lime mixture is adjusted so as to maintain the necessary high temperature for fusion, but without employing more coke than is necessary for this purpose.

A small furnace which has been found to operate satisfactorily to carry out the fusion step of my process had approximately the following dimensions:

40 centimeters diameter at the middle;
30 centimeters diameter at the top;
110 centimeters in height.

This furnace was set upon a base of firebrick. The base was provided with a substantially U-shaped passage or inverted siphon-like channel about two inches in diameter. This siphon-like channel allowed the slag to run freely from the furnace, but prevented flame emerging therefrom, thereby tending to prevent the loss of volatile cæsium, lithium and rubidium present in the beryl. The blast was furnished with a centrifugal blower and the air was introduced by three tuyères placed symmetrically around the furnace about ten centimeters from the bottom.

The product of the furnace is entirely the slag formed by the fusion of the beryl-lime mixture. No reduction of metal takes place in the blast furnace. On a larger scale commercial production, the size of the furnace will, of course, be increased.

In the fusion of the beryl with the lime, no distinct chemical reaction appears to take place. The beryl is essentially a silicate of beryllium and aluminum, often carrying small amounts of the rare alkali metals, such as cæsium, rubidium and lithium, as well as potassium and sodium. When this is fused with the lime, it is changed to a basic silicate which, of course, contains besides the elements just enumerated a certain amount of lime. The ratio of lime to beryl which is preferably employed is slightly over one part of the lime to two parts of the beryl, although it is possible to use either a greater or a smaller ratio. The ratio of approximately one-half of lime to beryl is found to give about the right melting point to the slag. Moreover, if a greater amount of lime is used, more acid has to be used in the subsequent step of the process in order to decompose the fused mass.

I prefer to use lime as the basic or alkaline material to open up the beryl because of its low cost and also because the calcium sulphate which is formed in the latter step of treatment with sulphuric acid is insoluble and may be removed along with the silica and aids in the silica filtration. However, other alkaline materials may be used, such as other alkaline earth metals, hydroxides or carbonates, as those of magnesium. The carbonates or hydroxides of the alkali metals, such as potassium or sodium, may be mixed with lime or may be used alone. Also chlorides of the alkali metals or alkaline earth metals may be mixed with the oxides or carbonates of the alkaline earth metals or alkali metals. The blast furnace is of considerable advantage in case the oxides or hydroxides or carbonates of the alkali metals, such for example, as sodium hydroxide, are used, since the blast furnace may be made of firebrick so that the slag is not contaminated with metal as it would be if the beryl were fused with sodium hydroxide in an iron pot.

If it is desired to sublimate the compounds of the rare alkaline earth metals, such as cæsium, rubidium and lithium, alkali metal chlorides may be introduced with the charge to convert these metals into their chlorides which are sublimated in the flames from the furnace and may be collected. Preferably, however, the operation is carried on so as to prevent sublimation of the cæsium, rubidium and lithium compounds so that they may be recovered as hereinafter described.

(2) *Decomposition of the slag and water extraction*

The melt from the furnace is allowed to cool and is crushed and ground to fine powder. It is then mixed with approximately an equal volume of water and treated with slightly more sulphuric acid than theoretically required to decompose it. The acid acts violently, boiling and giving off fumes of sulphuric acid. The mass is stirred to prevent the formation of hard lumps and is added with thorough stirring into a vat of water which is heated, preferably to the boiling point by means of steam. The resultant material, which consists of the undissolved residue and supernatant water solution, may be then filtered through a filter press, although it is preferred to allow the material to stand for about twelve hours and then again heat it to the boiling point with stirring. The material is then filtered through a filter press to separate the solution from the undissolved residue. The residue is then washed, the wash water being used in dissolving the next batch of sulphated slag.

The heating of the material renders the silica insoluble and in condition so that the material may be satisfactorily filtered through a filter press.

The solution consists mainly of the sulphates of beryllium and aluminum, together with small amounts of iron, compounds of the alkali metals and a little dissolved silica. Sulphuric acid is the preferred acid used for decomposing the slag because of its cheapness, because the calcium is converted into its sulphate which is insoluble and is removed during the filtration operation, and because it converts the metallic constituents into sulphates so that certain of them may be removed as alums in the subsequent treatment. During the filtration, the calcium which was introduced by the lime and which may have been present in the ore, is removed along with the greater part of the silica. The insoluble calcium sulphate assists in the removal of the silica.

While, as above stated, it is preferred to use the sulphuric acid, other acid treatment may be employed. For example, the slag may be decomposed with a solution of sodium acid sulphate in the form of nitre cake, although such a procedure introduces sodium which would interfere with the recovery of rubidium and cæsium, in case these metals are present in sufficient amounts to warrant recovery. While I prefer to use either the sulphuric acid or an acid salt of sulphuric acid, it is possible to decompose the slag with other mineral acids, such for example, as hydrochloric acid, particularly where beryllium-containing phosphates are treated.

The amount of water added after the sulphuric acid treatment is preferably sufficient to give the resultant solution a specific gravity of about 1.36.

Usually, and for all practical purposes, the heating of the water solution formed by stirring the sulphuric acid-treated mass into a vat of water as described above, is sufficient to render practically all of the silica insoluble. However, as a variation in the process in case such solution is not heated to the boiling point or in case it should be desirable to further remove silica, the solution may be evaporated to dryness to render any remaining silica insoluble and then redissolved with boiling water and filtered to remove such silica.

(3) *Recovery of rubidium and cæsium*

The solution resulting from the next previous step in the operation is allowed to cool and to stand until the crystallization of the alums derived from the rubidium, cæsium and potassium has ceased. These alums are then carefully removed and saved for the cæsium and rubidium. These alums all have the same general formula as potash alum. The sodium and lithium sulphates remain in solution.

The cæsium rubidium and potash alums are dissolved and subjected to a fractional recrystallization during which the cæsium alums with a minute amount of rubidium alum rapidly accumulates in the least soluble portions. The alums are separated from each other by further fractional crystallization, or the separation may be carried out by the precipitation of cæsium antimony chloride and the crystallization of rubidium acid tartarate. The steps heretofore described may be applied to ores which contain cæsium and rubidium, other than beryllium-bearing ores, particularly the silicate ores of cæsium and rubidium, such as feldspars, lepidolites, etc., in case the process is to be carried out primarily for the recovery of cæsium and rubidium. This feature of the invention, therefore, is not limited to the treatment of beryllium-bearing ores, insofar as the recovery of cæsium and rubidium is concerned, but may be applied to other cæsium and rubidium-bearing ores.

(4) Removal of aluminum

The aluminum is separated from the beryllium as ammonium aluminum sulphate (ammonium alum). The mother liquor from which the cæsium, rubidium and potassium alums were crystallized is treated with an excess of ammonium sulphate. A slight excess of ammonium sulphate, say 10% or over may be used, although the excess may be more than this, if desired. The ammonium sulphate converts the aluminum sulphate into ammonium alum, which may be removed by crystallization.

The ammonium sulphate is preferably added to the boiling mother liquor and then the liquor set aside to cool and deposit the alum. The liquor is cooled, preferably to about 15° C. or even lower, which causes the ammonium alum to crystallize out. The solution is allowed to stand until no further crystallization of the ammonium alum takes place.

Then, in order to effect further crystallization, the mother liquor is evaporated to about one-half of its original volume and allowed to cool and stand for several hours, usually from twenty-four to forty-eight hours. The solution is preferably cooled to 15° or even 0°. While it is preferred to cool the solutions from which the ammonium alum is crystallized, crystallization may be effected at ordinary room temperatures. The remaining aluminum is thus precipitated as further amounts of ammonium alum until substantially all of the aluminum is thus separated. Some traces of aluminum, however, remain, which are later removed along with the iron in the next subsequent step.

In order that no beryllium be lost, the ammonium alum crystals first obtained are dissolved in the wash water obtained from the basic beryllium carbonate from a later stage in the process and are re-crystallized from this wash water.

The crystals are removed and the mother liquor used to dissolve and re-crystallize the second crop of ammonium crystals obtained after the solution has been concentrated as above described. The crystals thus obtained are then treated with the wash water from the beryllium basic carbonate step, like the crystals obtained in the first ammonium alum crystallization.

The solution from which the ammonium alum is re-crystallized and containing some beryllium is retained and added to the solution from which ammonium alum is to be crystallized.

While it is preferred to concentrate the solution to remove further amounts of aluminum as the ammonium alum, the greater part of the aluminum may be removed by the simple crystallization without the concentration and the remaining aluminum may be removed along with the iron in the next step.

While it is preferred to use ammonium sulphate and to separate the aluminum as ammonium alum, it is possible to use other sulphates, such as potassium sulphate, in which case the aluminum is precipitated as a potash alum. If this is done, the ammonium compounds in the subsequent steps are replaced with corresponding potassium salts and more dilute solutions should be employed. Furthermore, if, at the end of the recovery of beryllium as beryllium basic carbonate, as described later, there is ammonium carbonate mixed with the beryllium basic carbonate, the ammonium carbonate may be removed by heating, which removal by heating would not apply to the potassium salts. Furthermore, if the beryllium is precipitated as a hydroxide as later described, an excess of ammonium hydroxide does not redissolve the precipitate, whereas an excess of potassium hydroxide would redissolve it. Therefore, I prefer to use ammonium sulphate as the reagent to remove the aluminum as ammonium alum, although it would be possible to use reagents such as potassium sulphate, to remove the aluminum as another alum.

(5) Removal of iron and remaining traces of aluminum

The filtrate from the ammonium alum crystals is next heated, preferably in a stoneware, wood or lead vessel, by means of a lead steam coil, to boiling point and thoroughly oxidized. This oxidation may be carried out in any suitable way, such as by blowing air through the solution, or it may be accomplished with chlorine, hydrogen peroxide, sodium peroxide, sodium perborate, potassium bromate or any oxidizing agent. The liquor is then treated with ammonium hydroxide or other alkaline hydroxides or salts, such for example, as calcium or sodium hydroxide, or calcium or sodium carbonate, with very thorough stirring and boiling.

The precipitated hydroxides rapidly dissolve at first. As the addition of ammonium hydroxide is continued, the liquid turns reddish and then finally ferric hydroxide separates as a very finely divided precipitate. The addition of ammonium hydroxide is stopped as soon as the supernatant liquid gives a white precipitate upon dilution with water, indicating that the liquid is basic. It is rather important at this stage of the process to add the ammonium hydroxide carefully and see that the mass is thoroughly stirred and well boiled. The precipitated hydroxides should be given time to react with the solution so that beryllium hydroxide redissolves.

The final precipitate consists mainly of ferric hydroxide, together with some aluminum hydroxide and a small amount of beryllium hydroxide, as well as the hydroxides of scandium and gallium in case these latter two metals are present in the ore. While I prefer to use ammonium hydroxide to render the solution basic, other basic materials may be used, such as milk of lime or sodium hydroxide. The milk of lime may be used with substantially the same results as the ammonium hydroxide. Sodium hydroxide, however, tends to contaminate the ammonium sulphate which is recovered at the end of the operation, and therefore, the preferred reagents to render the solution basic are either ammonia or milk of lime.

Aside from throwing out some of the iron and aluminum as the hydroxides, these basic reagents reduce the hydrogen-ion concentration sufficiently so that the hydrogen sulphide in the next step can completely remove the final traces of iron as iron sulphide and at the same time remove copper and other heavy metals.

The hydroxides formed by the treatment of the solution with ammonium hydroxide or lime are removed by filtration, preferably through a large lead Buchner funnel. Any beryllium accompanying the ferric hydroxide can be largely saved by stirring the residue with water, boiling and treating with sulphuric acid until, after long stirring, the filtered liquid shows the presence of some iron by its brownish tint. This liquid after filtration may be returned to the vessel and carefully treated with ammonium hydroxide as previously described, to precipitate ferric hydroxide which may be filtered out. The filtrate may be added to the solution containing the beryllium.

The basic acetate method may also be used for separating the iron from the solution. A minute amount of iron usually remains in solution. The introduction of ammonium acetate causes a little more bother in subsequent operations, owing to the frothing when the beryllium is thrown out as basic carbonate. It also remains in the ammonium sulphate mother liquors which are used over again for the separation of aluminum. It is therefore preferred to effect the separation of the iron as ferric hydroxide.

The filtrate from which the ferric and aluminum hydroxides are removed is then further treated to remove the remaining amounts of iron and any members of the copper group. This is preferably done by treating the filtrate with hydrogen sulphide under slight pressure. Other sulphides may be used in place of hydrogen sulphide, such for example, as the alkali metal sulphides, sodium, potassium or ammonium sulphides. This precipitates the iron, copper, etc. as sulphides which may be filtered out.

I have found that the solution obtained after such filtration remains clear when treated with solid ammonium carbonate and warmed. This clear solution did not become discolored by treatment with hydrogen sulphide, indicating the absence of iron. Should there be a darkening of the solution, owing to the presence of traces of iron, the solution should again be saturated with hydrogen sulphide. Any difficulty in removing iron at this stage indicates that the solution was not made sufficiently basic during the removal of the major part of the ferric hydroxide.

(6) *Recovery of beryllium*

The beryllium is recovered preferably as a precipitate of beryllium basic carbonate. The iron and aluminum free filtrate from the next previous step is heated to drive off any hydrogen sulphide. The beryllium is then precipitated by the addition of ammonium carbonate and ammonium hydroxide in slight excess. Boiling the solution for a short time causes the precipitate to become granular so that it may be readily filtered and washed. The first wash water is added to the main filtrate, while the wash waters that are later obtained are used for recrystallizing the crude ammonium alum, as described under the step of the removal of aluminum. By so using the wash water, the ammonium sulphate is not lost. The beryllium basic carbonate precipitated as above described is of a variable composition. It may contain, for example, as low as 20% of beryllium oxide or as high as 40%. Instead of using a mixture of ammonium hydroxide and ammonium carbonate, as indicated, it is possible to use ammonium hydroxide and carbon dioxide gas.

Any excess of ammonium carbonate which is mixed with the beryllium basic carbonate may be readily removed by heat.

The precipitation of the beryllium basic carbonate may also be accomplished by treating the solution with an alkali carbonate or bicarbonate, such as sodium or potassium carbonate or bicarbonate.

Instead of precipitating the beryllium as the basic carbonate, which is the preferred procedure, the beryllium may be precipitated as a beryllium hydroxide by treating the solution with a hydroxide alone, such as ammonium hydroxide, sodium hydroxide or potassium hydroxide. In precipitating the beryllium hydroxide with ammonium hydroxide, an excess of ammonium hydroxide does not redissolve the precipitate as does an excess of potassium or sodium hydroxide. It is therefore preferred to use ammonium hydroxide.

If it is desired to obtain a pure beryllium oxide, it is only necessary to heat the beryllium basic carbonate or the beryllium hydroxide to a red heat, thus converting it into the oxide. An advantage of keeping the beryllium in the form of its basic carbonate is that in this form it is soluble in acids, whereas the oxide is soluble only in hot concentrated sulphuric acid.

(7) *Recovery of ammonium sulphate*

The filtrate obtained after the precipitation and filtration of the beryllium basic carbonate is evaporated, allowing the ammonium sulphate to crystallize out. The crystals of ammonium sulphate are separated from the mother liquor and are re-used for the removal of aluminum in the treatment of further batches of the beryllium ore, as described under the previous step of the removal of the aluminum. The ammonium sulphate recovered at this stage of the operation is sufficient to meet the major requirements if not all the requirements for the removal of the aluminum.

(8) *Recovery of lithium*

The mother liquor from which ammonium sulphate is separated by crystallization is next treated with sodium carbonate to precipitate the lithium as lithium carbonate. The liquor may be treated with other carbonates, such as potassium or ammonium carbonate, to effect the precipitation of lithium carbonate. The lithium carbonate thus formed is separated from the filtrate by filtration and the filtrate is discarded.

While I have described in detail the preferred procedure in carrying out my invention and the preferred ores and materials employed, it is to be understood that the invention may be otherwise carried out within the scope of the following claims.

I claim:

1. That step in the herein described process of recovering beryllium, which comprises fusing a mixture of a beryllium-bearing ore and lime with a carbonaceous fuel in the blast furnace.

2. That step in the herein described process of extracting beryllium, which comprises fusing a beryllium silicate ore in a blast furnace together with a basic material so as to form a slag containing a basic beryllium silicate.

3. The process of treating beryllium-bearing ores, which comprises fusing the ore with lime to form a slag, decomposing the slag with acid and forming a water solution of the acid-soluble constituents of the slag, adding ammonium sulphate to the solution, removing aluminum from the solution by crystallizing it out as ammonium alum, removing the iron and the remaining traces of aluminum from the solution by oxidizing the solution and rendering basic and treating it with a sulphide leaving the beryllium in solution, and then recovering the beryllium by precipitating it as a basic compound from the solution.

4. The process of treating beryllium-bearing ores, which comprises fusing the ore with lime to form a slag, decomposing the slag with sulphuric acid and forming a water solution of the acid-soluble constituents of the slag, evaporating the solution to render contained silica insoluble, redissolving the soluble material, adding ammonium sulphate to the solution, crystallizing out the aluminum as ammonium alum, oxidizing and rendering the solution basic to precipitate iron as iron hydroxide and treating the basic solution with a sulphide to precipitate the further iron as iron sulphide, and treating the resulting solution which contains the beryllium with a basic reagent so as to precipitate a basic beryllium compound.

5. The process of treating beryllium-bearing ores, which comprises fusing the ore with lime to form a slag, decomposing the slag with sulphuric acid and forming a water solution of the acid-soluble constituents of the slag, evaporating the solution to render contained silica insoluble, crystallizing out the aluminum as ammonium alum, redissolving the soluble material, oxidizing and rendering the solution basic to precipitate iron as iron hydroxide and thereafter treating the basic solution with a sulphide to precipitate the further iron as iron sulphide, and treating the resulting solution which contains the beryllium with a carbonate so as to precipitate a basic beryllium carbonate.

6. The process of treating beryllium-bearing ores, which comprises fusing the ore with lime to form a slag, decomposing the slag with sulphuric acid and forming a water solution of the acid-soluble constituents of the slag, evaporating the solution to render contained silica insoluble, redissolving the soluble material, adding ammonium sulphate to the solution and crystallizing out the aluminum as ammonium alum, oxidizing and rendering the solution basic to precipitate iron as iron hydroxide and treating the solution with a sulphide to precipitate further iron as iron sulphide, treating the resulting solution which contains the beryllium with a basic material so as to precipitate a basic beryllium compound, evaporating the filtrate to crystallize out and thereby recover ammonium sulphate, and treating the mother liquor with a carbonate to recover contained lithium as lithium carbonate.

CHARLES JAMES.